(12) United States Patent
Idota et al.

(10) Patent No.: US 11,007,602 B2
(45) Date of Patent: May 18, 2021

(54) ULTRASONIC WELDING JIG, TERMINAL-EQUIPPED ELECTRIC CABLE MANUFACTURING METHOD, AND TERMINAL-EQUIPPED ELECTRIC CABLE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Tomoki Idota, Mie (JP); Ryouya Okamoto, Mie (JP); Hiroshi Shimizu, Mie (JP); Hitoshi Takeda, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(*) Notice: Subject to any disclaimer, the term of this patent is extended or adjusted under 35 U.S.C. 154(b) by 195 days.

(21) Appl. No.: 16/082,475

(22) PCT Filed: Feb. 23, 2017

(86) PCT No.: PCT/JP2017/006733
§ 371 (c)(1),
(2) Date: Sep. 5, 2018

(87) PCT Pub. No.: WO2017/154586
PCT Pub. Date: Sep. 14, 2017

(65) Prior Publication Data
US 2019/0344377 A1    Nov. 14, 2019

(30) Foreign Application Priority Data

Mar. 9, 2016    (JP) .............................. JP2016-045226

(51) Int. Cl.
*B23K 20/10* (2006.01)
*H01R 4/02* (2006.01)
(Continued)

(52) U.S. Cl.
CPC ............. *B23K 20/10* (2013.01); *H01R 4/023* (2013.01); *H01R 43/0207* (2013.01); *B23K 2101/32* (2018.08)

(58) Field of Classification Search
CPC ........ B23K 20/10–106; B23K 2101/32; B23K 2101/38; B23K 1/06; B23K 20/004;
(Continued)

(56) References Cited

U.S. PATENT DOCUMENTS 3,750,926 A * 8/1973 Sakamoto ............ B23K 20/106
228/1.1
4,032,378 A * 6/1977 McDonald ............ B29C 65/086
216/8
(Continued)

FOREIGN PATENT DOCUMENTS

GB    2373206 A  *  9/2002  ............. B23K 20/10
JP    60250891 A  * 12/1985  ............. B23K 20/10
(Continued)

OTHER PUBLICATIONS

Machine translation of JP 2015-167957A (no date available).*
Official Communication issued in International Bureau of WIPO Patent Application No. PCT/JP2017/006733, dated May 30, 2017.

*Primary Examiner* — Kiley S Stoner
(74) *Attorney, Agent, or Firm* — Greenblum & Bernstein, P.L.C.

(57) ABSTRACT

An ultrasonic welding jig includes: an anvil that supports a plate-like electric cable connection portion of a terminal; and a welding horn that is disposed so as to oppose the anvil, and in which a fitting groove is formed in an opposing surface, the fitting groove being a groove in which a portion
(Continued)

of a core wire of an electric cable is fitted. In a state in which the core wire and the electric cable connection portion are clamped between the welding horn and the anvil, ultrasonic welding is performed by ultrasonically vibrating the welding horn in an axial direction of the core wire. In a bottom surface of the fitting groove of the welding horn, a plurality of slippage prevention grooves that are obliquely oriented and intersect an axis of the fitting groove are formed spaced apart in a direction of the axis of the fitting groove.

9 Claims, 19 Drawing Sheets

(51) Int. Cl.
  *H01R 43/02* (2006.01)
  *B23K 101/32* (2006.01)
(58) Field of Classification Search
  CPC .... B23K 20/005; B23K 20/007; H01R 4/023; H01R 43/0207; H01R 43/0263; H01R 4/027; H01R 43/28; B29C 65/08–088; B29C 65/06–069
  USPC ............................ 228/110.1, 1.1, 4.5, 180.5; 156/73.1–73.5, 580.1–580.2
  See application file for complete search history.

(56) References Cited

U.S. PATENT DOCUMENTS

| | | | | |
|---|---|---|---|---|
| 4,767,492 A * | 8/1988 | Fukusima | ............... | B29C 65/08 156/580.2 |
| 4,776,509 A * | 10/1988 | Pitts | ..................... | B23K 20/106 219/56.1 |
| 5,193,732 A * | 3/1993 | Interrante | ............... | H01L 24/78 228/1.1 |
| 5,390,844 A * | 2/1995 | Distefano | ............ | B23K 20/025 228/180.21 |
| 5,868,301 A * | 2/1999 | Distefano | ............ | B23K 20/025 228/1.1 |
| 6,089,438 A * | 7/2000 | Suzuki | ................... | B23K 20/10 228/1.1 |
| 6,523,732 B1 * | 2/2003 | Popoola | ............... | B23K 20/106 228/1.1 |
| 7,337,938 B2 * | 3/2008 | Noro | ..................... | B23K 20/106 156/580.1 |
| 7,413,108 B2 * | 8/2008 | Vasquez | ............ | H01L 21/67138 228/180.5 |
| 2004/0088857 A1 * | 5/2004 | Fujimoto | ........... | H01R 43/0207 29/871 |
| 2004/0226148 A1 * | 11/2004 | Haws | ................... | B29C 66/1224 24/399 |
| 2005/0258215 A1 * | 11/2005 | Vasquez | ............ | H01L 21/67138 228/180.5 |
| 2005/0263241 A1 * | 12/2005 | Lidicky | ............... | B29C 66/8432 156/216 |
| 2006/0065697 A1 * | 3/2006 | Kobae | ..................... | H01L 24/81 228/110.1 |
| 2006/0163315 A1 * | 7/2006 | Delsman | ............... | B23K 20/106 228/1.1 |
| 2007/0175591 A1 * | 8/2007 | Panzetti | ............... | B29C 66/4322 156/580.1 |
| 2010/0140325 A1 * | 6/2010 | Tokutomi | ............. | B23K 20/106 228/110.1 |
| 2011/0198122 A1 * | 8/2011 | Sagawa | ................... | H01R 4/029 174/84 R |
| 2012/0178604 A1 * | 7/2012 | Ippers | .................. | B29C 66/1122 493/343 |
| 2014/0014709 A1 | 1/2014 | Takayashiki | | |
| 2014/0103095 A1 * | 4/2014 | Walker | ................. | B23K 20/004 228/1.1 |
| 2014/0312097 A1 * | 10/2014 | Miyazato | ............. | H01R 43/00 228/111 |
| 2015/0336206 A1 * | 11/2015 | Broekelmann | .... | B23K 20/1205 228/110.1 |
| 2017/0346197 A1 * | 11/2017 | Nabeta | ................... | B23K 20/10 |
| 2019/0287940 A1 * | 9/2019 | Delsman | ................ | B23K 26/40 |

FOREIGN PATENT DOCUMENTS

| | | | |
|---|---|---|---|
| JP | 01-139986 | 9/1989 | |
| JP | 2012-148325 | 8/2012 | |
| JP | 2012-192413 | 10/2012 | |
| JP | 2013-004406 | 1/2013 | |
| JP | 2015-167957 | 9/2015 | |
| WO | WO-2012077281 A1 * | 6/2012 | ............ B23K 20/10 |

* cited by examiner

US 11,007,602 B2

ULTRASONIC WELDING JIG, TERMINAL-EQUIPPED ELECTRIC CABLE MANUFACTURING METHOD, AND TERMINAL-EQUIPPED ELECTRIC CABLE

TECHNICAL FIELD

The technology disclosed in this specification relates to an ultrasonic welding jig, a terminal-equipped electric cable manufacturing method, and a terminal-equipped electric cable.

BACKGROUND ART

Ultrasonic welding is known as a method for connecting an end of a core wire, which is composed of a stranded wire, of an electric cable to a bus bar. To be specific, ultrasonic welding is performed, using an ultrasonic welding jig that includes an anvil and a welding horn, such that the core wire of an electric cable is placed on a bus bar supported on the anvil, and ultrasonic vibrations in the axial direction are applied, with the core wire being pressed by the welding horn, and thus the core wire is ultrasonically welded to the bus bar (see Patent Document 1 listed below).

Here, in order to effectively cause ultrasonic vibrations to act on the core wire, it is important to prevent slippage between the welding horn and the core wire. For this reason, a slippage prevention means is conventionally used. The slippage prevention means has a structure in which an arc-shaped fitting groove for positioning the core wire and into which the core wire is fitted is formed in the core wire pressing surface of the welding horn, and a plurality of slippage prevention grooves extending in a direction perpendicular to the axis of the fitting groove are formed in the bottom surface of the fitting groove spaced apart in the axial direction of the fitting groove, so as to prevent slippage by using a so-called edge effect in which the groove edges of the slippage prevention grooves bite into the outer circumference of the strands that constitute the core wire.

CITATION LIST

Patent Document

Patent Document 1: JP 2013-4406A

SUMMARY OF INVENTION

Technical Problem

However, with the conventional slippage prevention means that is based on the edge effect, the slippage preventability may not be sufficiently exhibited depending on the specifications (diameter, hardness, and the like) of the strands that constitute the core wire. In order to complement the slippage preventability, increasing the pressing force of the welding horn on the core wire can also be considered. However, when the pressing force is increased, the core wire undergoes significant deformation in which the cross-sectional area decreases (for example, flattening), which results in the core wire being likely to break, and the fixing force is impaired, and thus this measure is simply not a solution.

The technology disclosed in this specification has been accomplished under the circumstances described above, and it is an object of the present disclosure to enable ultrasonic welding to be performed properly while suppressing damage to the core wire.

Solution to Problem

An ultrasonic welding jig disclosed in this specification is an ultrasonic welding jig for fixedly attaching a core wire of a core wire-equipped electric cable to a plate-like electric cable connection portion of a terminal that includes the electric cable connection portion through ultrasonic welding, the ultrasonic welding jig including: an anvil that supports the electric cable connection portion of the terminal; and a welding horn that is disposed so as to oppose the anvil, and in which a fitting groove is formed in an opposing surface, the fitting groove being a groove into which a portion of a transverse cross section of the core wire of the electric cable is fitted. In a state in which the core wire and the electric cable connection portion are clamped between the welding horn and the anvil, ultrasonic welding is performed by ultrasonically vibrating the welding horn in an axial direction of the core wire, and in a bottom surface of the fitting groove of the welding horn, a plurality of slippage prevention grooves that are obliquely oriented and intersect an axis of the fitting groove are formed spaced apart in a direction of the axis of the fitting groove.

Because the slippage prevention grooves are formed such that they are obliquely oriented and intersect the axis of the fitting groove, the groove edges of the slippage prevention grooves latch onto the outer circumference of the core wire over a long region, and thus a high level of slippage preventability is exhibited even in an embodiment in which the pressing force on the core wire is not increased. That is, it is possible to perform ultrasonic welding properly while suppressing damage to the core wire. As a result, it is possible to obtain a high fixing force in the welded portion.

The ultrasonic welding jig may have the following configurations.

The core wire may be composed of a stranded wire in which a plurality of strands are twisted together, and the slippage prevention grooves may be oriented and intersect the axis of the fitting groove at an angle that is substantially equal to a twist angle of the strands that constitute the core wire.

In the case where the core wire of the electric cable is composed of a stranded wire, the groove edges of the slippage prevention grooves latch onto a long region of the strands that constitute the core wire, and thus a high level of slippage preventability is exhibited even in an embodiment in which the pressing force on the core wire is not increased.

The slippage prevention grooves may be formed so as to have a large width that allows the strands of the core wire to be fitted therein.

The strands that constitute the core wire of the electric cable are fitted into the slippage prevention grooves over a long region, and thus a higher level of slippage preventability is exhibited.

In the bottom surface of the fitting groove of the welding horn, in addition to the slippage prevention grooves, a plurality of auxiliary grooves that have a width that is smaller than the width of the slippage prevention grooves may be formed so as to be oriented perpendicular to the slippage prevention grooves.

As a result of the auxiliary grooves abutting against the strands in an orientation perpendicular to the strands, the auxiliary grooves produce an edge effect, and an even higher level of slippage preventability is exhibited overall.

A knurled groove may be formed in the bottom surface of the fitting groove of the welding horn.

The groove edges of the grooves of the knurled groove that extend in two directions that are perpendicular to each other latch onto the outer circumference of the core wire over a long region, and thus slippage preventability is exhibited. In the case where the core wire is composed of a stranded wire, the grooves extending in one direction function as the slippage prevention grooves that latch onto the strands over a long region, and the grooves extending in the other direction function as the grooves that produce the edge effect.

A terminal-equipped electric cable manufacturing method disclosed in this specification includes: ultrasonically welding a core wire of an electric cable to a plate-like electric cable connection portion that is provided in a terminal by using the ultrasonic welding jig described above.

Another terminal-equipped electric cable manufacturing method includes: ultrasonically welding a core wire, which is composed of a stranded wire, of an electric cable to a plate-like electric cable connection portion that is provided in a terminal by using the ultrasonic welding jig described above.

A terminal-equipped electric cable disclosed in this specification is a terminal-equipped electric cable obtained by ultrasonically welding a core wire of a core wire-equipped electric cable onto a plate-like electric cable connection portion of a terminal that includes the electric cable connection portion. On an outer surface of a welded portion of the core wire, a plurality of ridges that are obliquely oriented and intersect an axis of the core wire are formed spaced apart in an axial direction of the welded portion.

Also, the core wire may be composed of a stranded wire in which a plurality of strands are twisted together, and the ridges may be oriented and intersect the axis of the core wire at an angle that is substantially equal to a twist angle of the strands that constitute the core wire.

Advantageous Effects of Invention

According to the technology disclosed in this specification, it is possible to perform ultrasonic welding properly while suppressing damage to the core wire.

DESCRIPTION OF EMBODIMENTS

Embodiment 1

Figure 13:
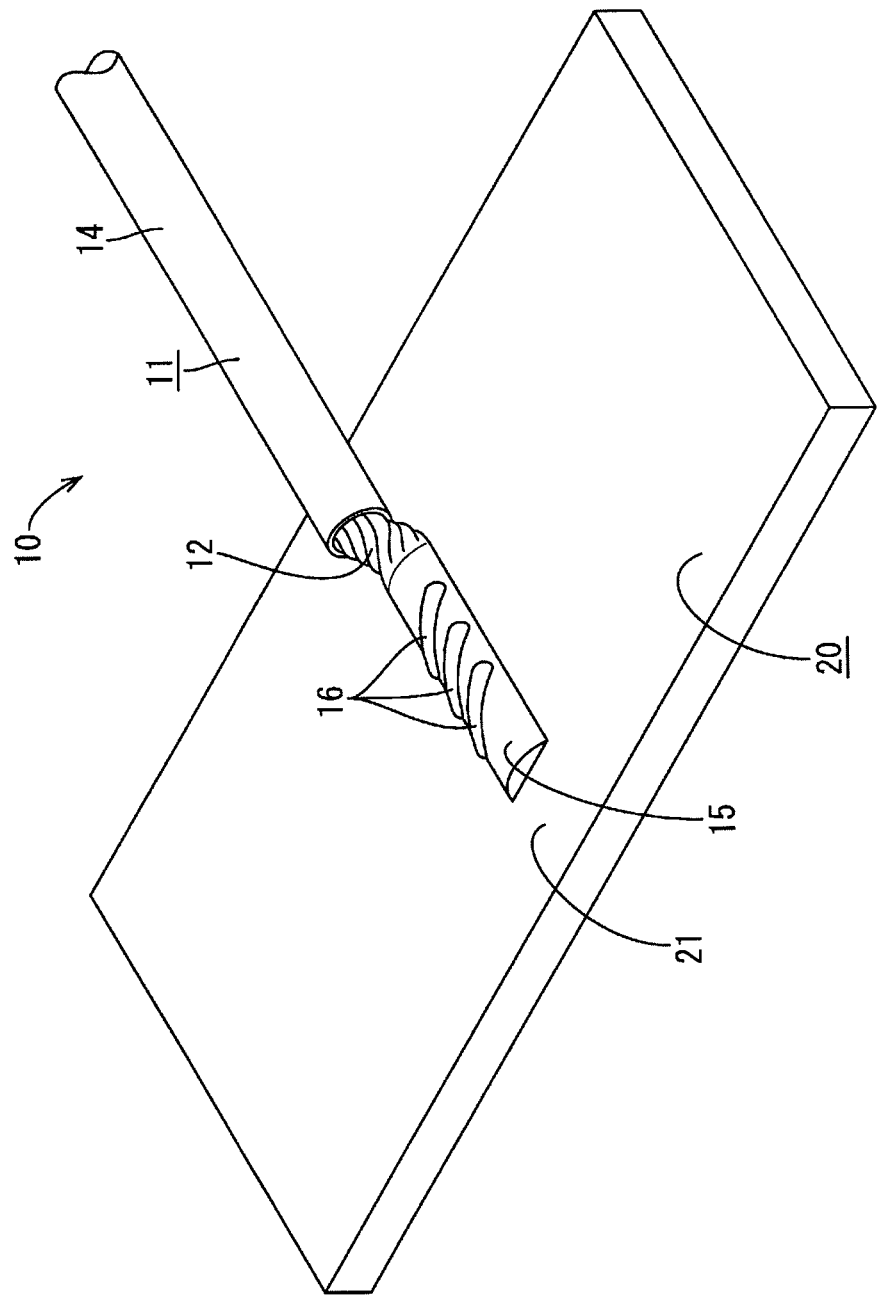
FIG. 13 is a perspective view of a terminal-equipped electric cable.

Embodiment 1 will be described with reference to FIGS. 1 to 15. As shown in FIG. 13, a terminal-equipped electric cable 10 according to the present embodiment has a structure in which a bus bar 20 (corresponding to a terminal) is connected to an end of a sheathed electric cable 11 (corresponding to an electric cable) through ultrasonic welding, and is used in, for example, a wiring portion such as a battery module mounted on an electric vehicle.

Figure 2:
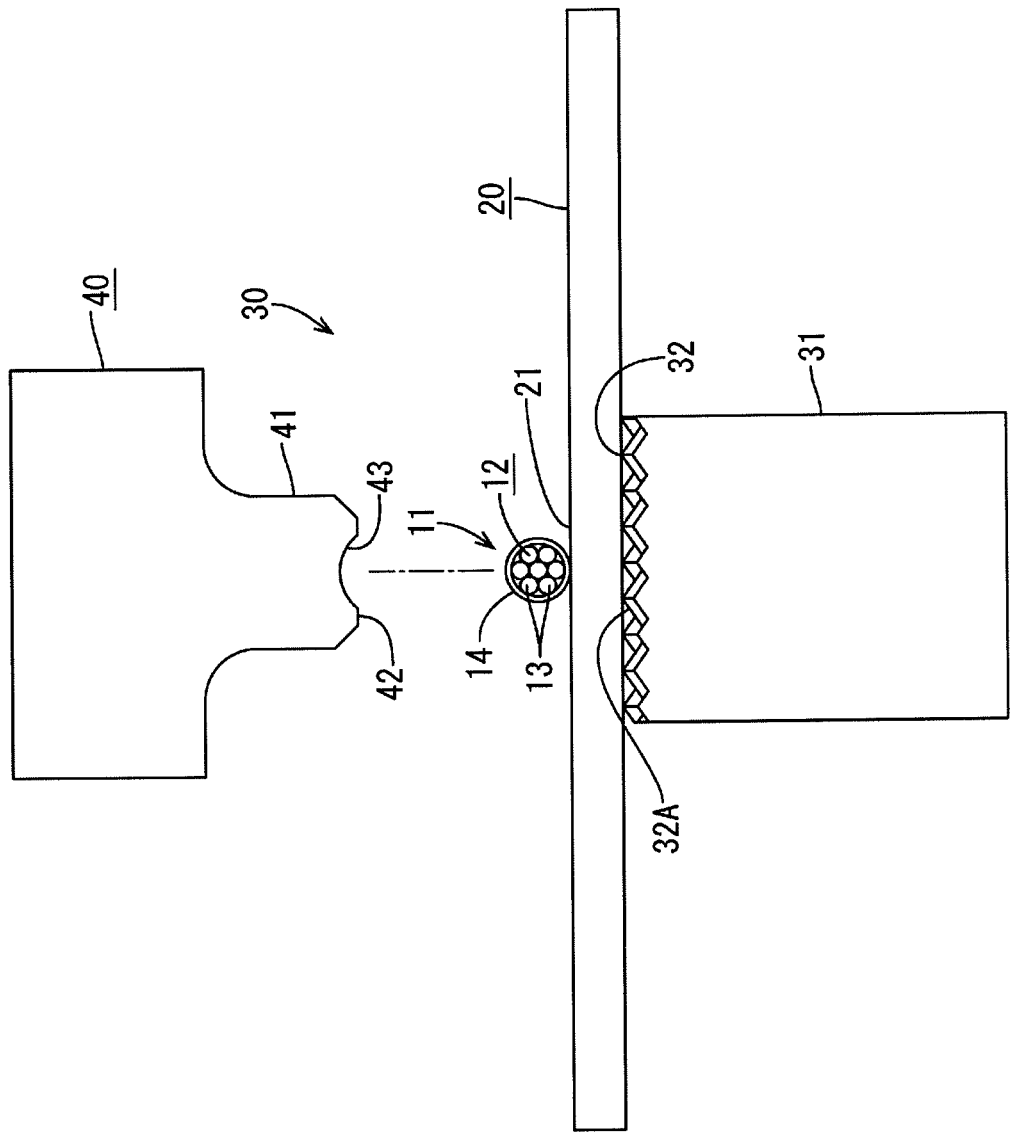
FIG. 2 is a front view of the same before ultrasonic welding is performed.
Figure 4:
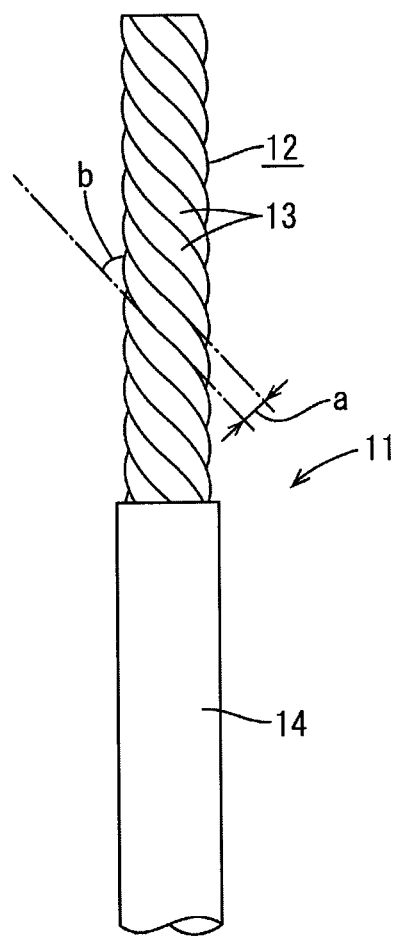
FIG. 4 is a plan view of an end of a sheathed electric cable.
Figure 5:
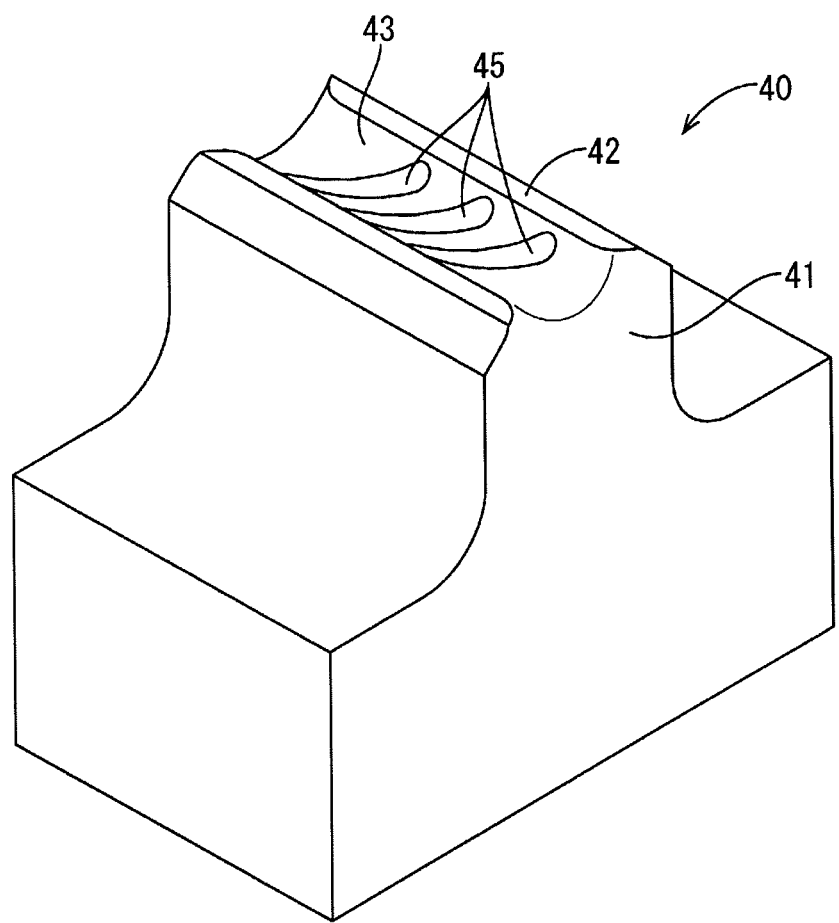
FIG. 5 is a perspective view of a welding horn, which is turned upside down.

As shown in FIGS. 2 and 4, the sheathed electric cable 11 has a structure in which the outer circumference of a core wire 12, which is composed of a stranded wire in which seven metal strands 13 are twisted together as shown in the diagrams, is covered with an insulation sheath 14 that is made of a synthetic resin. A predetermined length of the insulation sheath 14 has been stripped from an end of the sheathed electric cable 11 so as to expose the core wire 12.

Specifically, as shown in FIG. 4, the core wire 12 is formed by twisting together seven strands 13, each having a diameter a, at a twist angle b.

Figure 1:
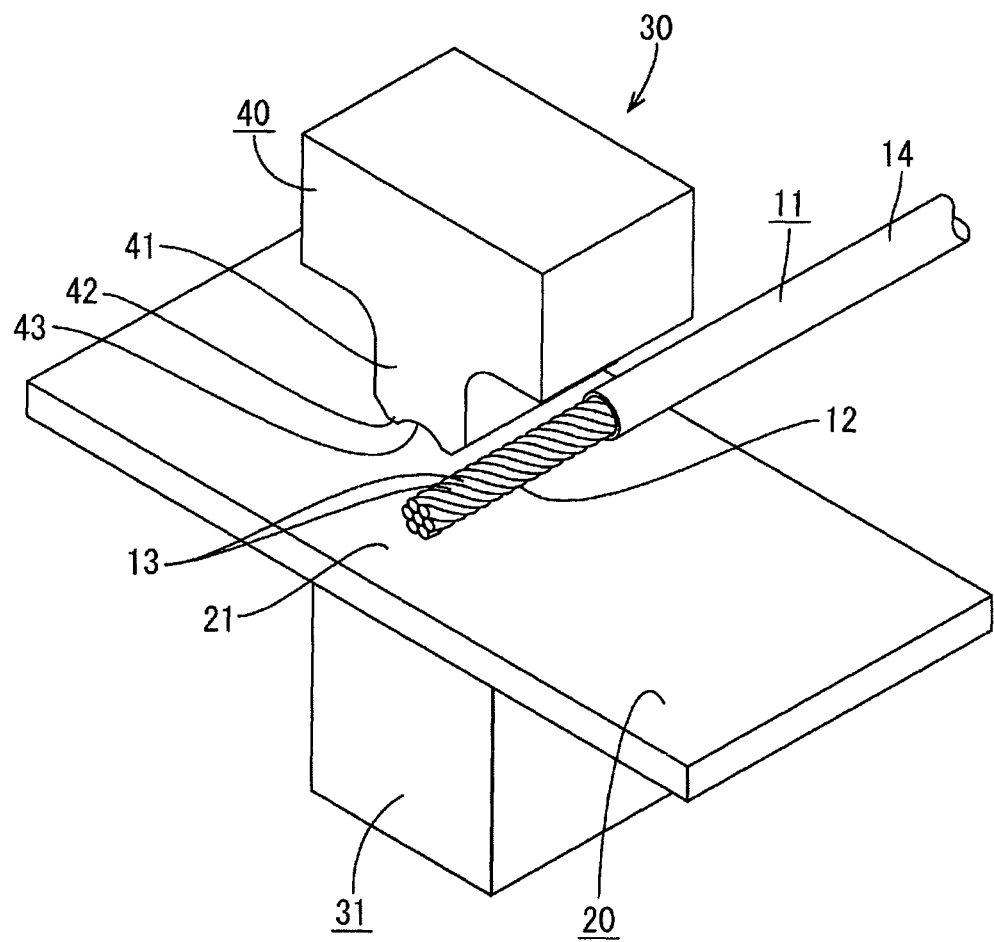
FIG. 1 is a perspective view of an ultrasonic welding jig according to Embodiment 1 before ultrasonic welding is performed.

The bus bar 20 is made of metal. As shown in FIG. 1, the bus bar 20 has a plate-like shape that is rectangular when viewed in a plan view and has short sides that are longer than the length of the exposed core wire 12 of the sheathed electric cable 11 described above.

An electric cable connection portion 21 is set at a center portion of the bus bar 20 in the length direction (the direction extending along the long sides) of the bus bar 20. As will be described later, the end of the core wire 12 of the sheathed electric cable 11 is placed on the electric cable connection portion 21 so as to extend in a direction extending along the short sides of the bus bar 20, and is fixedly attached to the electric cable connection portion 21 through ultrasonic welding.

Figure 3:
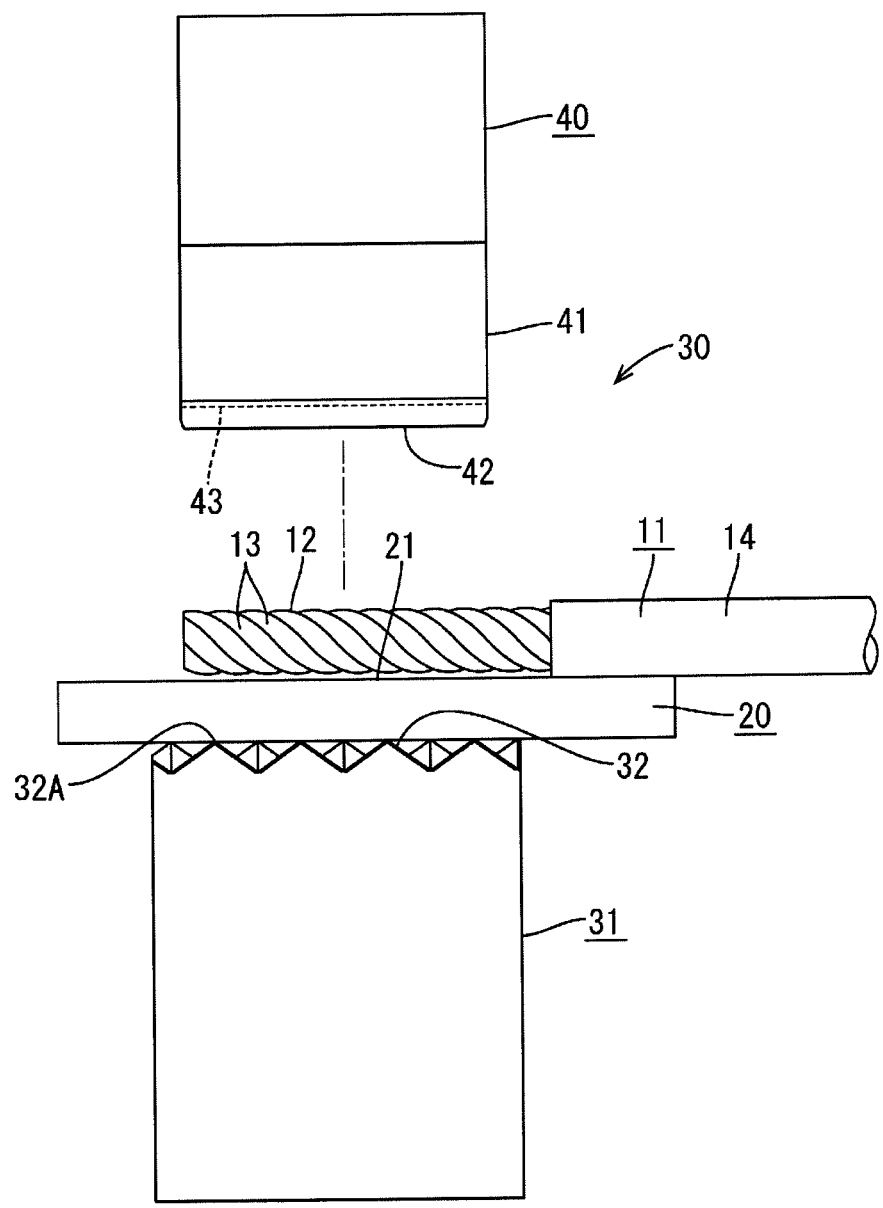
FIG. 3 is a side view of the same before ultrasonic welding is performed.

As shown in FIGS. 1 to 3, an ultrasonic welding jig 30 includes an anvil 31 and a welding horn 40 that is provided above the anvil 31 opposing the anvil 31.

The anvil 31 is provided in a fixed manner, and the upper surface of the anvil 31 serves as a supporting surface 32 for supporting the electric cable connection portion 21 of the bus bar 20. Knurls 32A are formed on the supporting surface 32 to prevent slippage.

The welding horn 40 includes, on its lower surface, a pressing portion 41 for pressing the end of the core wire 12 of the sheathed electric cable 11, the pressing portion 41 being formed in a protruding manner. The welding horn 40 is configured to be capable of moving in the vertical direction, which is a direction in which the welding horn 40 moves toward or away from the anvil 31, using a driving mechanism (not shown), and being ultrasonically vibrated in a direction extending along the short sides of the bus bar 20 as indicated by the arrows in FIG. 10, or in other words, in the axial direction of the core wire 12.

The lower surface of the pressing portion 41 of the welding horn 40 serves as a pressing surface 42. As shown in FIGS. 5 to 8, in the pressing surface 42, a fitting groove 43, into which the upper side of a transverse cross section of the core wire 12 is fitted, is formed so as to extend over the entire length of the pressing surface 42 (the right left direction in FIG. 8). The fitting groove 43 is formed so as to also function as a positioning groove for the core wire 12. Specifically, as shown in FIG. 2, the fitting groove 43 is formed so as to have an arc-shaped cross section that has a diameter slightly larger than the diameter of the core wire 12.

Figure 6:
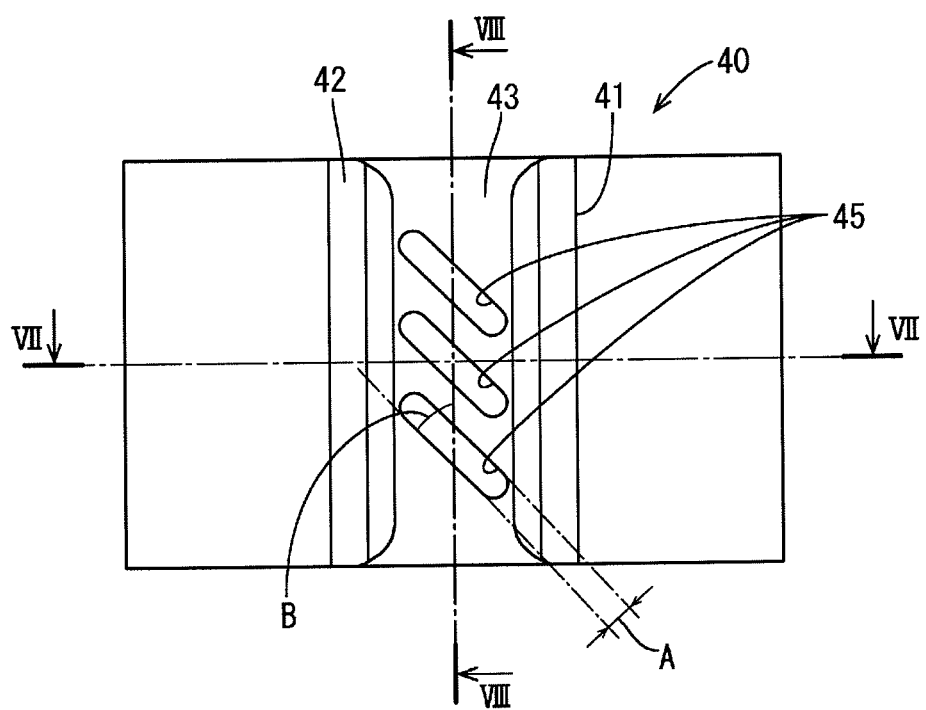
FIG. 6 is a bottom view of the welding horn.
Figure 7:
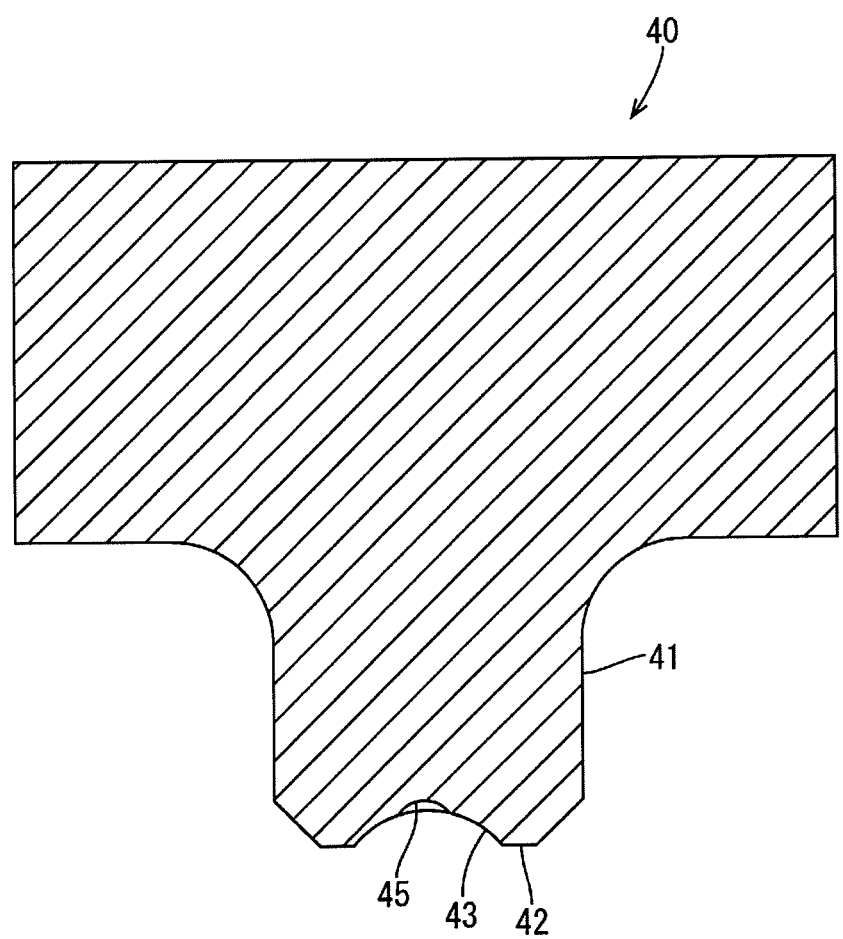
FIG. 7 is a cross sectional view taken along the line VII-VII shown in FIG. 6.
Figure 8:
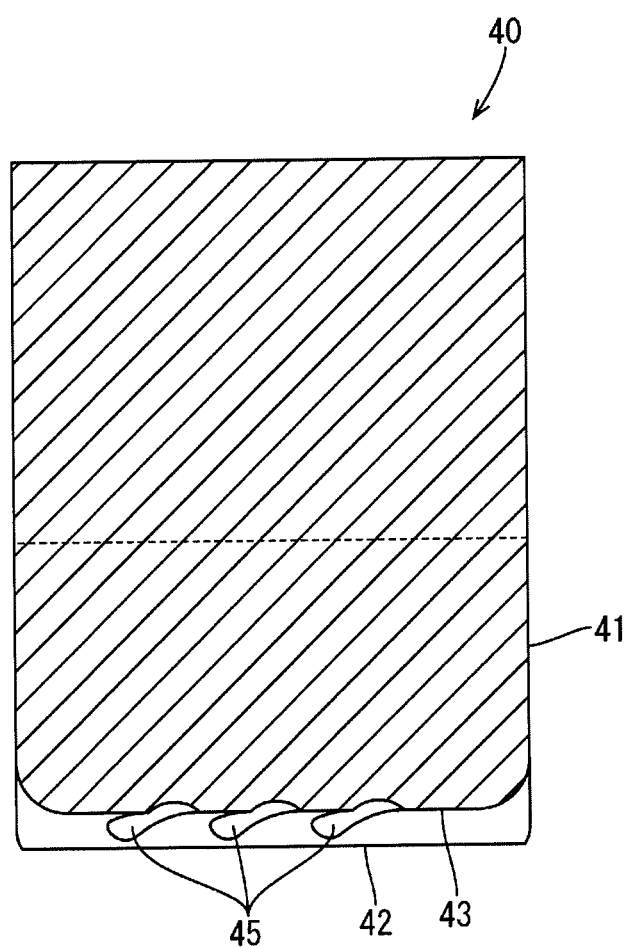
FIG. 8 is a cross sectional view taken along the line VIII-VIII shown in FIG. 6.

In the bottom surface of the fitting groove 43, as shown in FIG. 6, three slippage prevention grooves 45 that are obliquely oriented and intersect the axis of the fitting groove 43 are formed so as to be spaced apart at a predetermined interval in the axial direction of the fitting groove 43. Each slippage prevention groove 45 has an arc-shaped cross section (see FIG. 7), and is formed so as to extend over substantially the entire width of the bottom surface of the fitting groove 43.

To be more specific, as shown in FIG. 6, a groove width A of each fitting groove 45 is set to be substantially equal to the diameter a of each strand 13 that constitutes the core wire 12 of the sheathed electric cable 11 (A≈a), and an intersection angle B of the slippage prevention grooves 45 relative to the axis of the fitting groove 43 is set to be substantially equal to the twist angle b of each strand 13 that constitutes the core wire 12 (B≈b).

Also, a dimension substantially equal to the diameter a of each strand 13 is set as the interval between the fitting grooves 45.

Next, an example of a procedure for manufacturing a terminal-equipped electric cable 10 will be described.

As shown in FIGS. 1 to 3, in a state in which the welding horn 40 of the ultrasonic welding jig 30 is retracted to an upper position, the electric cable connection portion 21 of the bus bar 20 is placed on the supporting surface 32 of the anvil 31. Next, the exposed end of the core wire 12 of the sheathed electric cable 11 is placed on the electric cable connection portion 21 of the bus bar 20 that is supported on the anvil 31.

Figure 9:
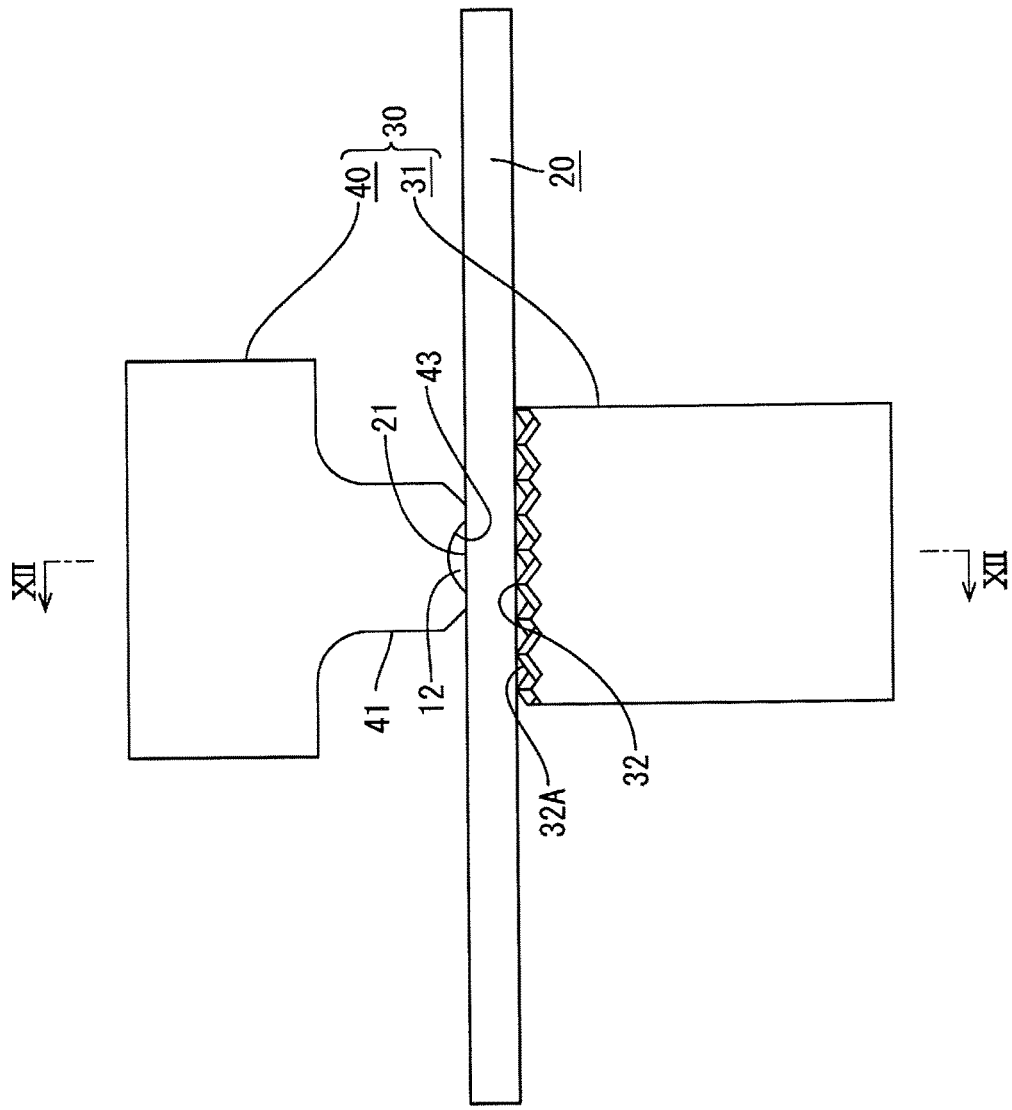
FIG. 9 is a front view showing ultrasonic welding according to an embodiment.
Figure 10:
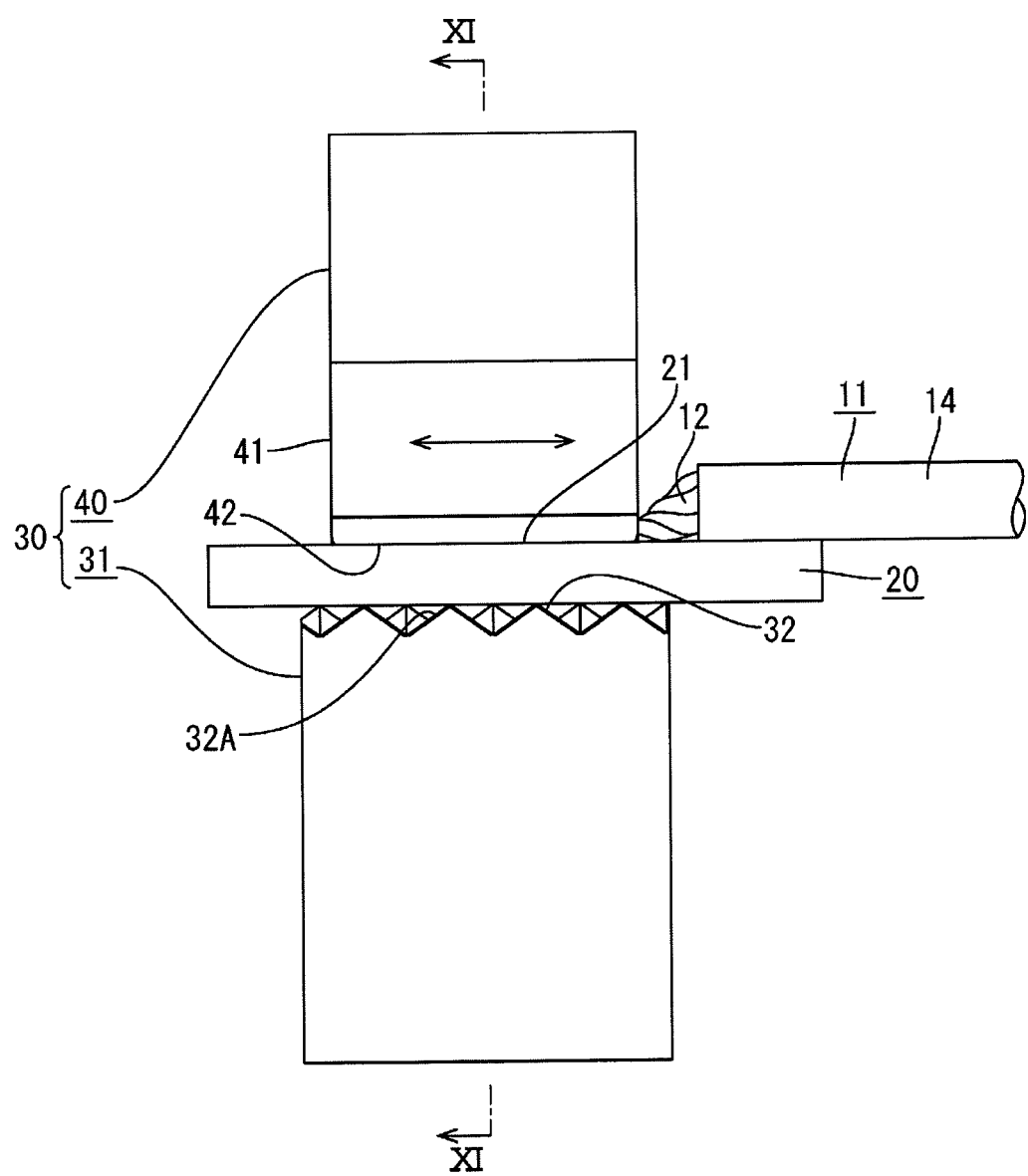
FIG. 10 is a side view showing ultrasonic welding according to the embodiment.
Figure 11:
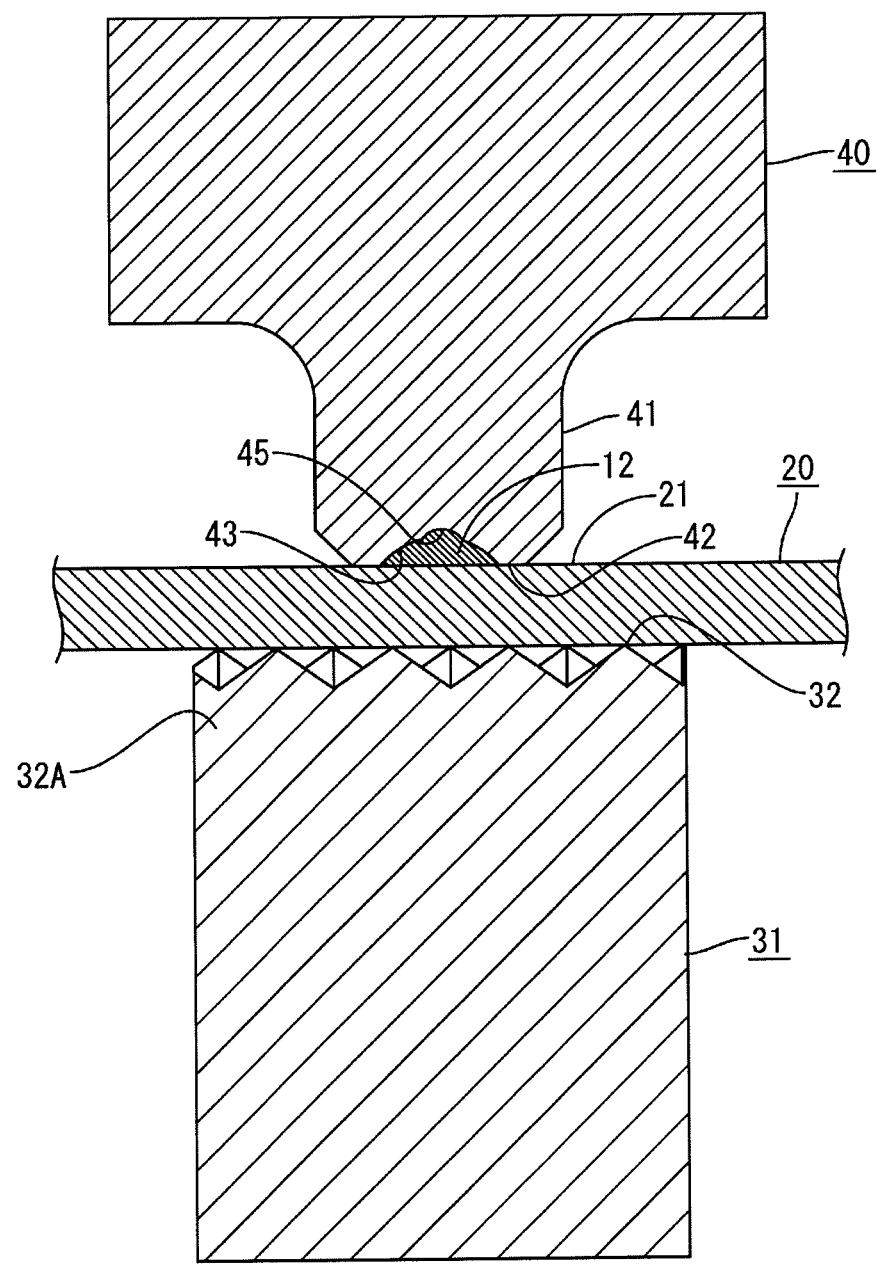
FIG. 11 is a cross sectional view taken along the line XI-XI shown in FIG. 10.
Figure 12:
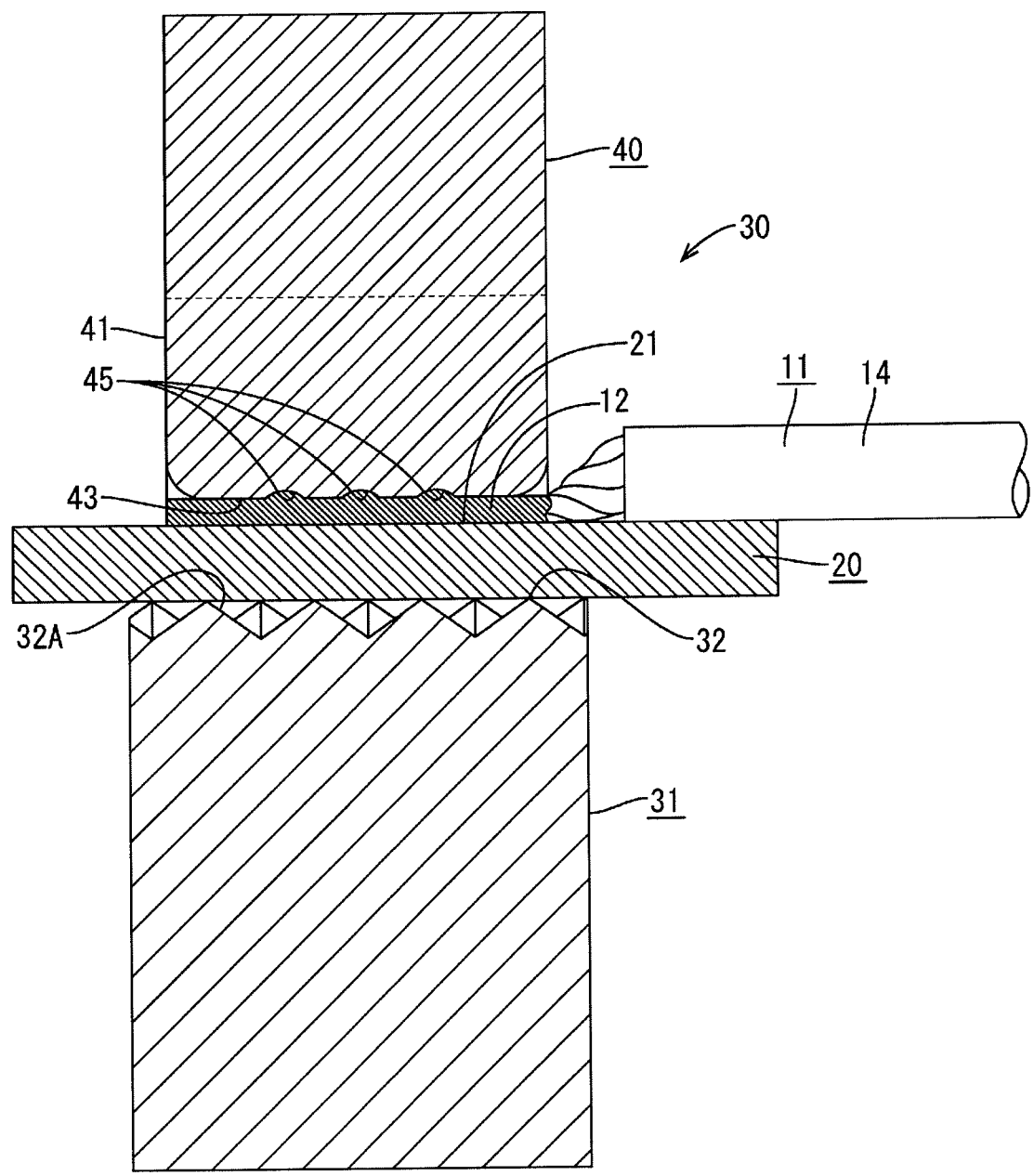
FIG. 12 is a cross sectional view taken along the line XII-XII shown in FIG. 9.

When the bus bar 20 and the core wire 12 of the sheathed electric cable 11 have been set, the welding horn 40 is moved downward, and as shown in FIGS. 9 and 10, the core wire 12 is pressed against the electric cable connection portion 21 of the bus bar 20, with the core wire 12 fitting into the fitting groove 43 and being positioned by the fitting groove 43.

As a result, the knurls 32A formed on the supporting surface 32 of the anvil 31 bite into the lower surface of the electric cable connection portion 21 of the bus bar 20, and the bus bar 20 is supported on the supporting surface 32 of the anvil 31 in a non-slip manner.

On the other hand, the core wire 12 of the sheathed electric cable 11 is compressed and fitted into the fitting groove 43 formed in the pressing surface 42 of the welding horn 40, and at the same time, a total of three alternate strands 13 out of the strands 13 on an opposing surface of the core wire 12 that opposes the fitting groove 43 are fitted into the slippage prevention grooves 45 formed in the bottom surface of the fitting groove 43.

After the pressing operation of the welding horn 40 has been performed in the manner described above, the welding horn 40 is ultrasonically vibrated in a direction indicated by the arrows shown in FIG. 10. Here, as described above, because three strands 13 out of the strands 13 that constitute the core wire 12 are fitted into the slippage prevention grooves 45 formed on the bottom surface of the fitting groove 43 over a long distance, the core wire 12 is ultrasonically vibrated together with the welding horn 40 in the axial direction of the core wire 12, without slippage occurring between the core wire 12 and the welding horn 40.

That is, on the electric cable connection portion 21 of the bus bar 20 that is supported on the supporting surface 32 of the anvil 31 in a non-slip manner, the core wire 12 is ultrasonically vibrated efficiently in the axial direction, with the exposed portion of the core wire 12 of the sheathed electric cable 11 being appropriately pressed. At this time, once the oxide film is removed from the bonding surface between the electric cable connection portion 21 of the bus bar 20 and the core wire 12, atomic diffusion occurs in the bonding surface, and atomic binding occurs. As a result, the core wire 12 of the sheathed electric cable 11 is ultrasonically welded and fixedly attached to the electric cable connection portion 21 of the bus bar 20.

Figure 14:
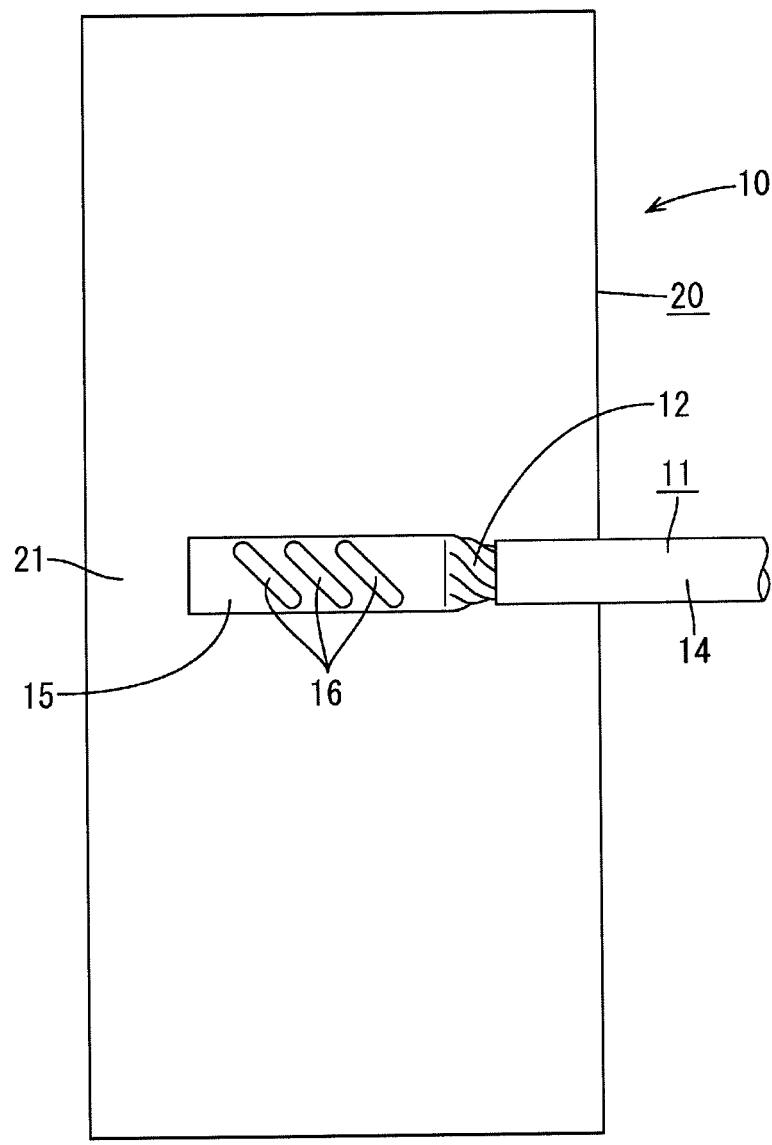
FIG. 14 is a plan view of the terminal-equipped electric cable.
Figure 15:
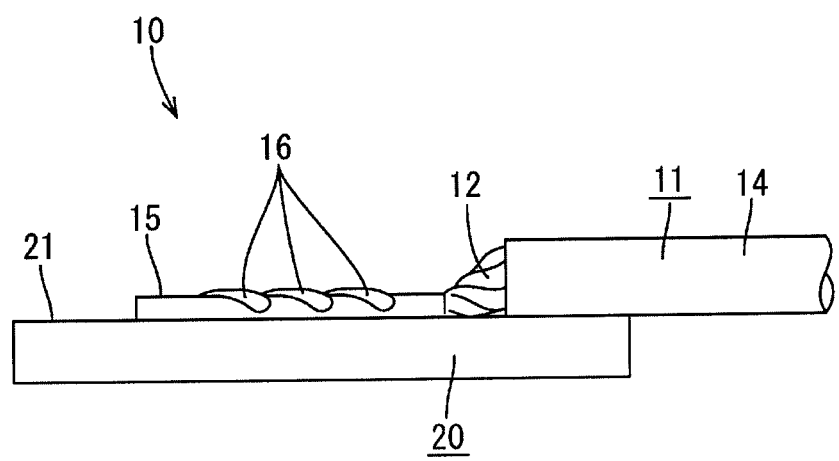
FIG. 15 is a side view of the terminal-equipped electric cable.

After the welding step, the ultrasonic vibration of the welding horn 40 is stopped, and the welding horn 40 is retracted upward. As a result, as shown in FIGS. 13 to 15, a terminal-equipped electric cable 10 is obtained in which the core wire 12 of the sheathed electric cable 11 has been fixedly attached to the electric cable connection portion 21 of the bus bar 20 through ultrasonic welding.

In the terminal-equipped electric cable 10, a portion (welded portion 15) of the core wire 12 that has been ultrasonically welded to the electric cable connection portion 21 of the bus bar 20 is formed in a rod-like shape that has an arc-shaped cross section that conforms to the fitting groove 43 formed in the pressing surface 42 of the welding horn 40. Also, on the outer circumferential surface of the welded portion 15, three ridges 16, which have arc-shaped cross sections that conform to the slippage prevention grooves 45 formed on the bottom surface of the fitting groove 43, are formed so as to be obliquely oriented and intersect the axis of the welded portion 15 at an angle that is substantially equal to the twist angle b of each strand 13, and are formed spaced apart in the axial direction of the welded portion 15.

As described above, in the present embodiment, as a slippage prevention means for preventing slippage between the welding horn 40 of the ultrasonic welding jig 30 and the core wire 12 of the sheathed electric cable 11, a structure is employed in which a fitting groove 43 that has an arc-shaped cross section and into which a portion of a transverse cross section of the core wire 12 is fitted is formed in the pressing surface 42 of the welding horn 40, and three slippage prevention grooves 45, which each have a groove width A that allows a strand 13 to be fitted therein, are formed in the bottom surface of the fitting groove 43 so as to be obliquely oriented and intersect the axis of the fitting groove 43 at an angle B that is substantially equal to the twist angle b of a strand 13, and to be spaced apart in the axial direction of the fitting groove 43.

Accordingly, a long region of the strands 13 that constitute the core wire 12 is fitted into the slippage prevention grooves 45, and thus a high level of slippage preventability is exhibited even in an embodiment in which the pressing force on the core wire 12 is not increased. That is, it is possible to perform ultrasonic welding properly while suppressing damage to the core wire 12. As a result, it is possible to obtain a high fixing force in the welded portion.

Embodiment 2

Figure 16:
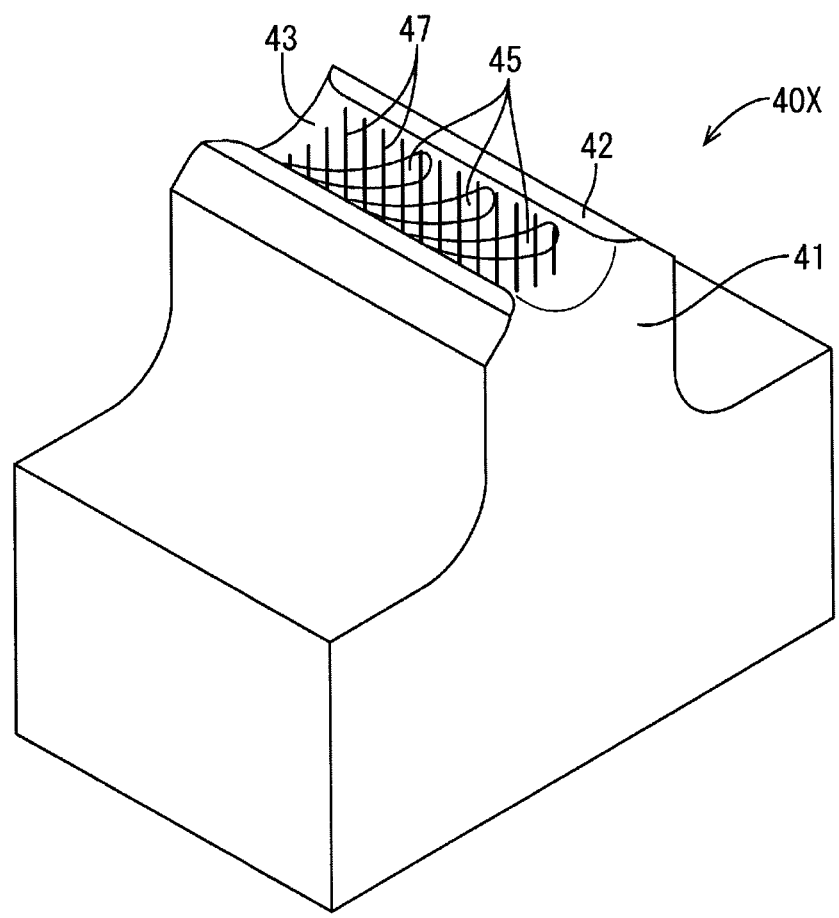
FIG. 16 is a perspective view of a welding horn according to Embodiment 2, which is turned upside down.
Figure 17:
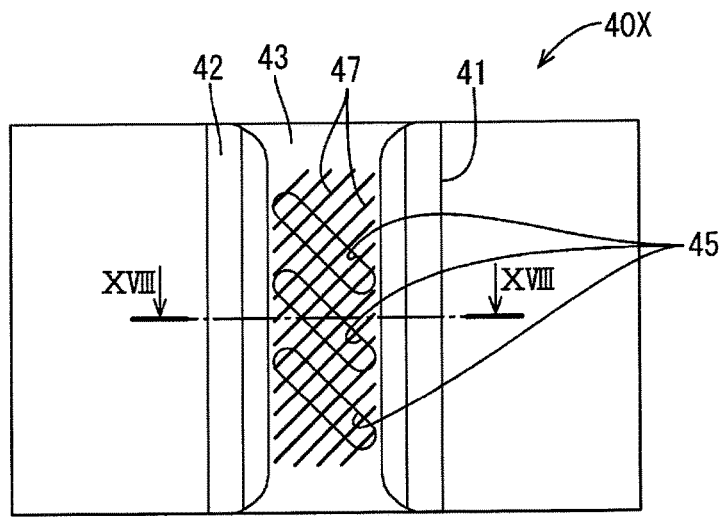
FIG. 17 is a bottom view of the welding horn.
Figure 18:
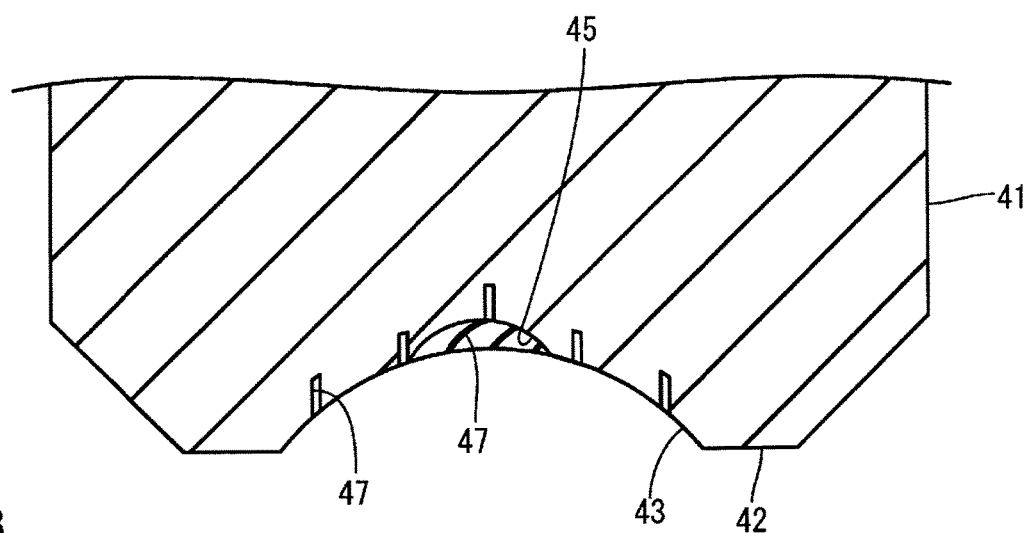
FIG. 18 is an enlarged cross sectional view taken along the line XVIII-XVIII shown in FIG. 17.

Embodiment 2 will be described with reference to FIGS. 16 to 18. In Embodiment 2, an improvement has been added to a slippage prevention structure for preventing slippage between a welding horn 40X and the core wire 12 of the sheathed electric cable 11. Specifically, in the bottom surface of the fitting groove 43 formed on the pressing surface 42 of the welding horn 40X, in addition to three slippage prevention grooves 45 as shown in Embodiment 1 described above, a plurality of (fifteen in the diagram) auxiliary grooves 47 that have a width that is smaller than that of the slippage prevention grooves 45 are formed so as to be oriented perpendicular to the slippage prevention grooves 45. As shown in FIG. 18, the auxiliary grooves 47 are formed in the form of slits.

Embodiment 2 is configured such that, when the core wire 12 of the sheathed electric cable 11 is compressed and fitted into the fitting groove 43 through the pressing operation of the welding horn 40X, in addition to a predetermined number of strands 13 out of the strands 13 that constitute the core wire 12 being fitted into the slippage prevention grooves 45, the auxiliary grooves 47 abut against the strands 13 at a right angle to the strands 13.

That is, in addition to a long region of the strands 13 that constitute the core wire 12 being fitted into the slippage prevention grooves 45, the auxiliary grooves 47 produce a so-called edge effect in which the groove edges of the auxiliary grooves 47 bite into the strands 13, and thus an even higher level of slippage preventability is exhibited overall.

Embodiment 3

Figure 19:
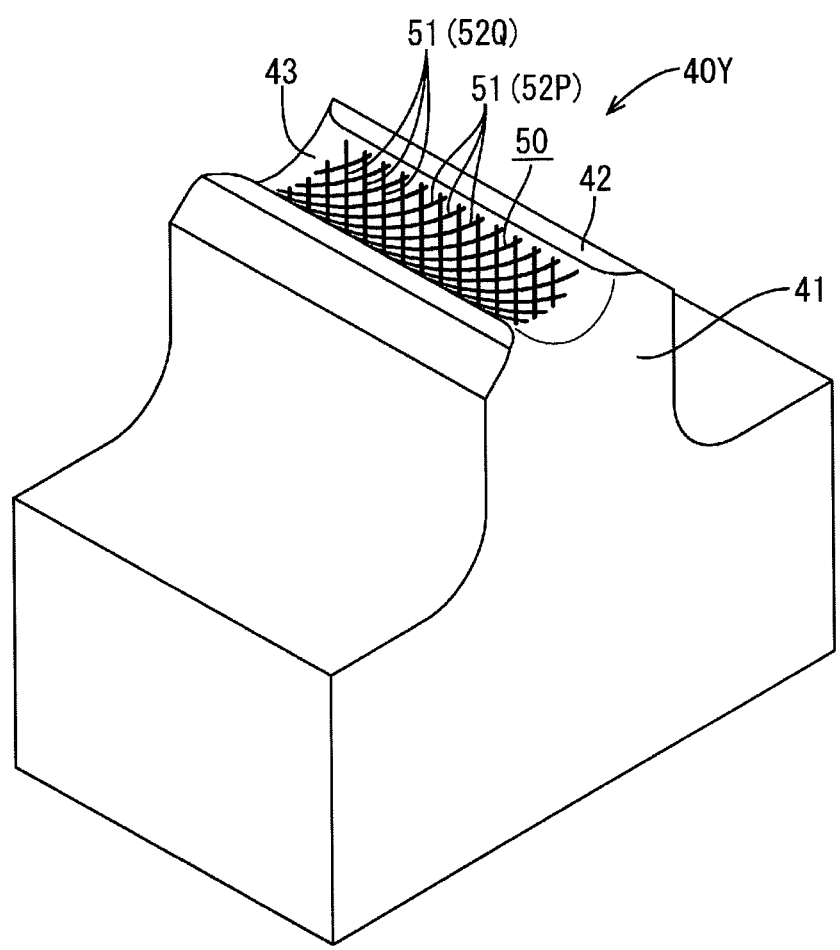
FIG. 19 is a perspective view of a welding horn according to Embodiment 3, which is turned upside down.
Figure 20:
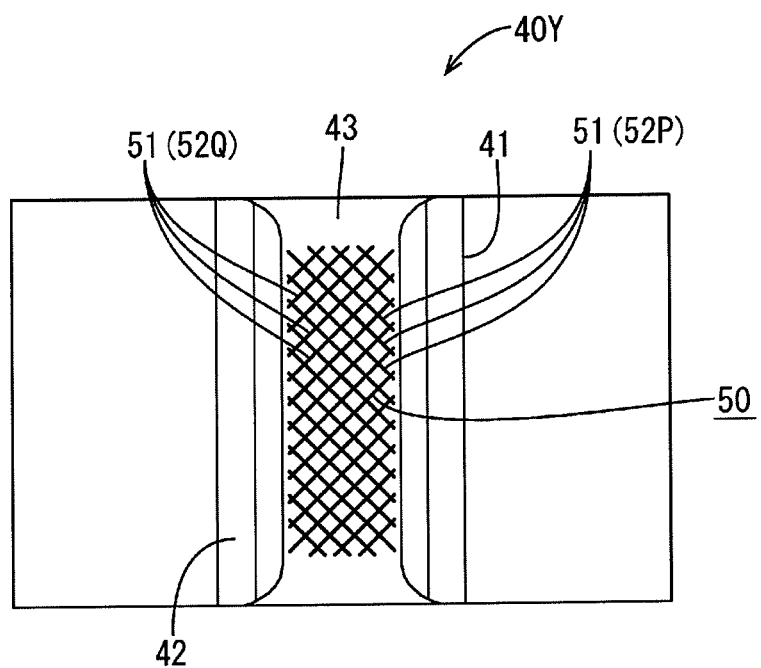
FIG. 20 is a bottom view of the welding horn.

Embodiment 3 will be described with reference to FIGS. 19 and 20. In Embodiment 3, yet another slippage prevention structure is shown in which a knurled groove 50 is formed in the bottom surface of the fitting groove 43 formed on the pressing surface 42 of a welding horn 40Y.

The knurled groove 50 is a groove in which a plurality of slits 51 that are similar to the auxiliary grooves 47 shown in Embodiment 2 above are formed in a grid pattern through cutting.

To be specific, the knurled groove 50 is formed such that a first slit group 52P including a plurality of slits 51 that are provided at a predetermined pitch and so as to be obliquely oriented and intersect the axis of the fitting groove 43 at an angle that is substantially equal to the twist angle b of a strand 13 (see FIG. 4) and a second slit group 52Q including a plurality of slits 51 that are provided at the same pitch as the slits 51 of the first slit group 52P and so as to be oriented perpendicular to the slits 51 of the first slit group 52P are provided in a grid pattern as described above.

In Embodiment 3, when the core wire 12 of the sheathed electric cable 11 is compressed and fitted into the fitting groove 43, an edge effect is produced in which the groove edges of the slits 51 of the first slit group 52P latch onto a long region of the strands that constitute the core wire 12, and the groove edges of the slits 51 of the second slit group 52Q that are perpendicular to the slits 51 of the first slit group 52P bite into the strands 13. Accordingly, the slippage preventability of preventing slippage between the welding horn 40Y and the core wire 12 of the sheathed electric cable 11 can be effectively exhibited.

Other Embodiments

The technology disclosed in this specification is not limited to the embodiments described above with reference to the drawings. For example, embodiments as described below are also encompassed in the scope of the technology disclosed in this specification.

(1) The terminal is not limited to a bus bar used as an example in the embodiments given above, and it is possible to use a terminal that has a structure in which a plate-like electric cable connection portion is provided rearward of a terminal connection portion that is connected to another terminal or the like.

(2) In the embodiments given above, an example has been described in which the core wire exposed at an end of the sheathed electric cable is ultrasonically welded, but the present invention is also applicable to a case where the core wire that is exposed at a position midway in the lengthwise direction of the sheathed electric cable is ultrasonically welded.

(3) In the embodiments given above, an example has been described in which the core wire is formed by twisting seven strands together, but the number of strands that are twisted together may be any number.

(4) The electric cable may include a bare stranded wire that does not include an insulation sheath.

(5) The width of the slippage prevention grooves that are formed in the bottom surface of the fitting groove of the welding horn may be set to any width dimension that is smaller than a maximum width that is set to a width at which the strands that constitute the core wire can substantially tightly fit therein. Also, the number of slippage prevention grooves, and the interval between slippage prevention grooves may also be set as appropriate according to conditions such as the diameter of the strands that constitute the core wire.

(6) The core wire of the electric cable is not limited to a stranded wire, and may be a single-core wire, or a straight wire in which a plurality of metal strands are linearly bundled. Even when a single-core wire or a straight wire is used, as long as the slippage prevention grooves are formed so as to be obliquely oriented and intersect the axis of the fitting groove, the groove edges of the slippage prevention grooves latch onto the outer circumference of the core wire over a long region, and thus a high level of slippage preventability is exhibited.

LIST OF REFERENCE NUMERALS

10 Terminal-equipped electric cable
11 Sheathed electric cable (electric cable)
12 Core wire
13 Strand
15 Welded portion
16 Ridge
20 Bus bar (terminal)
21 Electric cable connection portion
30 Ultrasonic welding jig
31 Anvil
40, 40X, 40Y Welding horn
42 Pressing surface (opposing surface)
43 Fitting groove
45 Slippage prevention groove
47 Auxiliary groove
50 Knurled groove
51 Slit
a Diameter (of strand 13)
b Twist angle (of strand 13)
A Groove width (of slippage prevention groove 45)
B Intersection angle (of slippage prevention groove 45)

The invention claimed is:

1. An ultrasonic welding jig for fixedly attaching a core wire of a core wire-equipped electric cable to a plate-shaped electric cable connection portion of a terminal through ultrasonic welding, the ultrasonic welding jig comprising:
   an anvil that supports the electric cable connection portion of the terminal; and
   a welding horn that is disposed so as to oppose the anvil, and in which a fitting groove is formed in an opposing surface, the fitting groove being a groove into which a portion of the core wire of the electric cable is fitted,
   wherein, in a condition in which the core wire and the electric cable connection portion are clamped between the welding horn and the anvil, ultrasonic welding is performed by ultrasonically vibrating the welding horn in an axial direction of the core wire, and
   in a bottom surface of the fitting groove of the welding horn, a plurality of slippage prevention grooves that are obliquely oriented and intersect an axis of the fitting groove are formed spaced apart in a direction of the axis of the fitting groove, and each of the slippage prevention grooves is nonintersecting with all other slippage prevention grooves on the bottom surface.

2. The ultrasonic welding jig according to claim 1,
   wherein the core wire is a stranded wire in which a plurality of strands are twisted together, and
   the slippage prevention grooves are oriented and intersect the axis of the fitting groove at an angle that is substantially equal to a twist angle of the strands that constitute the core wire.

3. The ultrasonic welding jig according to claim 2,
   wherein the slippage prevention grooves are formed so as to have a width that allows the strands of the core wire to be fitted therein.

4. An ultrasonic welding jig for fixedly attaching a core wire of a core wire-equipped electric cable to a plate-shaped electric cable connection portion of a terminal through ultrasonic welding, the ultrasonic welding jig comprising:
   an anvil that supports the electric cable connection portion of the terminal; and
   a welding horn that is disposed so as to oppose the anvil, and in which a fitting groove is formed in an opposing surface, the fitting groove being a groove into which a portion of the core wire of the electric cable is fitted,
   wherein, in a condition in which the core wire and the electric cable connection portion are clamped between the welding horn and the anvil, ultrasonic welding is performed by ultrasonically vibrating the welding horn in an axial direction of the core wire,
   in a bottom surface of the fitting groove of the welding horn, a plurality of slippage prevention grooves that are obliquely oriented and intersect an axis of the fitting groove are formed spaced apart in a direction of the axis of the fitting groove,
   the core wire is a stranded wire in which a plurality of strands are twisted together,
   the slippage prevention grooves are oriented and intersect the axis of the fitting groove at an angle that is substantially equal to a twist angle of the strands that constitute the core wire,
   the slippage prevention grooves are formed so as to have a width that allows the strands of the core wire to be fitted therein, and
   wherein, in the bottom surface of the fitting groove of the welding horn, in addition to the slippage prevention grooves, a plurality of auxiliary grooves that have a width that is smaller than the width of the slippage prevention grooves are formed so as to be oriented perpendicular to the slippage prevention grooves.

5. The ultrasonic welding jig according to claim 1,
   wherein a knurled groove is formed in the bottom surface of the fitting groove of the welding horn.

6. A terminal-equipped electric cable manufacturing method comprising:
   ultrasonically welding a core wire of an electric cable to a plate-shaped electric cable connection portion of a terminal by using the ultrasonic welding jig according to claim 1.

7. A terminal-equipped electric cable manufacturing method comprising:
   ultrasonically welding a core wire, which is a stranded wire, of an electric cable to a plate-shaped electric cable connection portion of a terminal by using the ultrasonic welding jig according to claim 2.

8. A terminal-equipped electric cable obtained by ultrasonically welding a core wire of a core wire-equipped electric cable to a plate-shaped electric cable connection portion of a terminal,
   wherein, on an outer surface of a welded portion of the core wire, a plurality of ridges that are obliquely oriented and intersect an axis of the core wire are formed spaced apart in an axial direction of the welded portion, and each of the ridges is nonintersecting with all other ridges on the outer surface.

9. A terminal-equipped electric cable obtained by ultrasonically welding a core wire of a core wire-equipped electric cable to a plate-shaped electric cable connection portion of a terminal,
   wherein, on an outer surface of a welded portion of the core wire, a plurality of ridges that are obliquely oriented and intersect an axis of the core wire are formed spaced apart in an axial direction of the welded portion,
   wherein the core wire is a stranded wire in which a plurality of strands are twisted together, and
   the ridges are oriented and intersect the axis of the core wire at an angle that is substantially equal to a twist angle of the strands that constitute the core wire.

* * * * *